United States Patent
Lagnado et al.

(10) Patent No.: US 7,895,461 B2
(45) Date of Patent: Feb. 22, 2011

(54) CLOCK SHIFTING AND PRIORITIZATION SYSTEM AND METHOD

(75) Inventors: Isaac Lagnado, Houston, TX (US); Ming He, Houston, TX (US); Henry F. Lada, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 815 days.

(21) Appl. No.: 11/888,368

(22) Filed: Jul. 31, 2007

(65) Prior Publication Data

US 2009/0037759 A1    Feb. 5, 2009

(51) Int. Cl.
G06F 1/00    (2006.01)
G06F 1/04    (2006.01)

(52) U.S. Cl. .................. 713/501; 713/500; 713/600

(58) Field of Classification Search .............. 713/501
See application file for complete search history.

(56) References Cited

U.S. PATENT DOCUMENTS

| | | | |
|---|---|---|---|
| 5,319,772 | A | 6/1994 | Hwang |
| 5,546,568 | A | 8/1996 | Bland et al. |
| 6,118,306 | A | 9/2000 | Orton et al. |
| 6,263,449 | B1 | 7/2001 | Motohashi |
| 6,560,240 | B1 | 5/2003 | Borland |
| 6,643,792 | B1 | 11/2003 | Kurosawa |
| 6,894,982 | B1 | 5/2005 | Shimizu |
| 7,035,606 | B2 | 4/2006 | Matsuura et al. |
| 7,103,342 | B2 | 9/2006 | Kusbel et al. |
| 7,111,179 | B1 | 9/2006 | Girson et al. |
| 7,112,978 | B1 * | 9/2006 | Koniaris et al. ............. 324/763 |
| 7,127,626 | B2 | 10/2006 | Inaba |
| 7,228,446 | B2 | 6/2007 | Jorgenson et al. |
| 2006/0053348 | A1 | 3/2006 | Chelstrom et al. |

FOREIGN PATENT DOCUMENTS

| | | |
|---|---|---|
| KR | 20000027589 | 5/2000 |
| KR | 1020000027589 A | 5/2000 |

OTHER PUBLICATIONS

PCT International Search Report and Written Opinion of the International Searching Authority, having a date of mailing of Dec. 30, 2008, in co-pending PCT International Patent Application No. PCT/US2008/008123 having an International Filing Date of Jun. 26, 2008 with the applicant being Hewlett-Packard Development Company, L.P., and entitled Clock Shifting and Prioritization System and Method.
DE Office Action dated Jun. 30, 2010, pp. 3.
Translation of DE Office Action dated Jun. 30, 2010, pp. 3.

* cited by examiner

Primary Examiner—Suresh K Suryawanshi

(57) ABSTRACT

A clock shifting and prioritization method comprising adjusting a frequency for a plurality of clocks corresponding to a plurality of respective components of an electronic device based on a desired user configuration setting for operating the electronic device.

27 Claims, 4 Drawing Sheets

*FIG. 2*

| | | MAXIMIZE 110 CONSERVATION OF POWER SUPPLY | MAXIMIZE PERFORMANCE OF PROCESSOR 120 | MAXIMIZE WIRELESS MODULE 140 |
|---|---|---|---|---|
| PROCESSOR CLOCK 122 | MAXIMUM FREQUENCY (MHz) 220 | 1200 | 2000 | 2200 |
| | MINIMUM FREQUENCY (MHz) 230 | 800 | 1600 | 800 |
| | FREQUENCY STEP ADJUSTMENT (MHz) 240 | 100 | 100 | 10 |
| HARD DISK DRIVE CLOCK 152 | MAXIMUM FREQUENCY (MHz) 220 | 150 | 200 | 200 |
| | MINIMUM FREQUENCY (MHz) 230 | 130 | 180 | 130 |
| | FREQUENCY STEP ADJUSTMENT (MHz) 240 | 2 | 2 | 2 |
| VIDEO BUS CLOCK 182 | MAXIMUM FREQUENCY (MHz) 220 | 50 | 70 | 65 |
| | MINIMUM FREQUENCY (MHz) 230 | 40 | 60 | 40 |
| | FREQUENCY STEP ADJUSTMENT (MHz) 240 | 1 | 2 | 1 |

| | PRIORITY 1 | PRIORITY 2 |
|---|---|---|
| CONFIGURATION 1 | MAXIMUM PERFORMANCE OF PROCESSOR 120 | MAXIMUM WIRELESS MODULE 140 |
| CONFIGURATION 2 | MAXIMUM CONSERVATION OF POWER SUPPLY 110 | MAXIMUM WIRELESS MODULE 140 |
| CONFIGURATION 3 | MAXIMUM WIRELESS MODULE 140 | MAXIMUM PERFORMANCE OF PROCESSOR 120 |
| CONFIGURATION 4 | MAXIMUM WIRELESS MODULE 140 | MAXIMUM CONSERVATION OF POWER SUPPLY 110 |

CLOCK SHIFTING AND PRIORITIZATION SYSTEM AND METHOD

BACKGROUND

Components within electronic devices typically include a clock which is used to synchronize and/or manage processing or communication activities. However, the frequencies at which the clocks operate sometimes adversely affect the overall performance of other components within the electronic device. For example, clocks which maximize the performance or speed of processing data may increase the battery consumption of the electronic device. In another example, component clocks operating at certain frequencies may generate noise, thereby adversely affecting the performance of the electronic device.

BRIEF DESCRIPTION OF THE DRAWINGS

FIG. 2 is an embodiment of a clock frequency database used by clock shifting and prioritization system of FIG. 1;

FIG. 3 is an embodiment of a prioritization database used by clock shifting and prioritization system of FIG. 1.

DETAILED DESCRIPTION OF THE DRAWINGS

Figure 1:
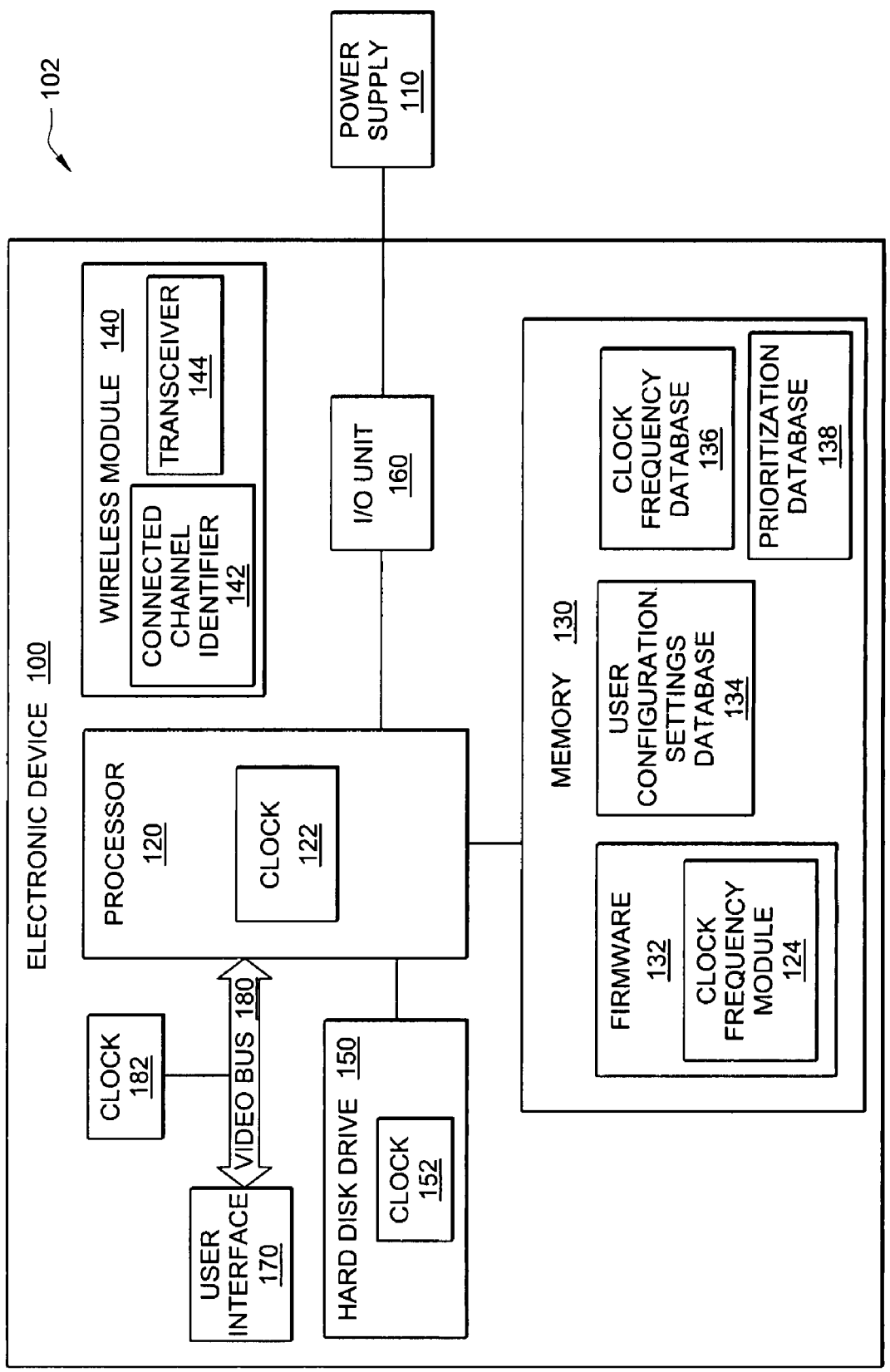
FIG. 1 illustrates a block diagram of an electronic device in which an embodiment of a clock shifting and prioritization system is employed to advantage.

FIG. 1 is a block diagram of an electronic device 100 in which an embodiment of a clock shifting and prioritization system 102 is employed to advantage. Clock shifting and priority system 102 is configured to automatically and dynamically adjust the clock frequencies of the components in electronic device 100 to enable electronic device 100 to operate and/or perform according to a user specified configuration and to resolve any frequency conflicts resulting from the adjustments. In the illustrative embodiment, system 102 comprises electronic device 100 and power supply 110. In the illustrative embodiment, power supply 110 is externally coupled to electronic device 100 and can any type of power source (e.g., a battery, a power supply brick, a power outlet, etc.) configured to provide a current and/or power to electronic device 100. It should be understood, however, that power supply 110 can be internally coupled to electronic device 100.

Electronic device 100 can be any type of electronic device such as, but not limited to, a desktop computer, a laptop computer, a tablet computer, a personal digital assistant (PDA), a cellular phone, a gaming device, or any type of portable or non-portable electronic device. In the embodiment illustrated in FIG. 1, electronic device 100 comprises a processor unit 120, a memory 130, a wireless module 140, a hard disk drive 150, an input/output (I/O) unit 160, and a user interface 170. It should be understood that components in electronic device 100 can be a hardware only embodiment, a software only embodiment, or any combination thereof. Processor 120 is used to manage and/or control the instructions and/or processes associated with adjusting the clock frequencies of the components in electronic device 100. In the illustrated embodiment, processor 120 comprises clock 122 configured to manage and/or control the speed with which processor 120 processes information, requests, and/or data.

In the illustrated embodiment, memory 130 comprises a firmware 132, user configuration settings 134, a clock frequency database 136, and a prioritization database 138. In some embodiments, firmware 132 is a set of read-only instructions configured to manage the initialization processes (e.g., via a basic input/output system (BIOS)) and/or communications with an operating system for electronic device 100. In the illustrated embodiment, firmware 132 comprises clock frequency module 124 configured to manage and/or adjust the clock frequencies for components in electronic device 100 based on a desired user configuration and to resolve any frequency conflicts resulting from the adjustments. A frequency conflict as used herein refers to any frequency on which a component clock is operating which interferes with the operation and/or performance of electronic device 100 such that electronic device 100 cannot operate and/or perform in compliance with the desired user configuration and/or results in the degradation of such performance. User configuration settings 134 identify the user-specified settings and/or operating configurations for which the user desires to operate electronic device 100. Example user configuration settings 134 include, but are not limited to, maximizing performance of processor 120, optimizing wireless communications, and/or maximizing power conservation and/or battery life for power supply 110. In the illustrated embodiment, clock frequency database 136 is a list of one or more of the clocks for component(s) in electronic device 100 and the associated frequency adjustment configurations (e.g., minimum operating frequency, maximum operating frequency, adjustment steps, etc.) for the corresponding clock. It should be understood that clock frequency database 136 can be any type of data storage system (e.g., a table, a chart, a file, etc.). In the illustrated embodiment, prioritization database 138 lists the priority of the desired user configuration setting 134 in the event frequency conflict arises in electronic device 100. A user can specify a user-prioritization scheme comprising one or more of user configuration settings 134 and the order of priority for user configuration settings 134. For example, a user can specify the maximum performance of processor 120 as a first priority and the second priority optimizing wireless communications.

In the illustrate embodiment, wireless module 140 manages and/or controls wireless communications for electronic device 100 across any type of network (e.g., internet, World Wide Web, etc.). In the illustrated embodiment, wireless module 140 comprises a connected channel identifier 142 and a transceiver 144. Connected channel identifier 142 indicates the receiving frequency at which wireless module 140 is connected to the network. Transceiver 144 is configured to both transmit and receive communications to and from electronic device 100. Hard disk drive 150 is a memory element that stores data and/or information for electronic device 100. In the illustrated embodiment, hard disk drive 150 comprises clock 152 configured to manage and/or control the rate and/or speed of the read and write operations for hard disk drive 150. Input/output unit 160 is a set of one or more interfaces and/or ports configured to enable one or more peripheral devices to interface with electronic device 100. In the illustrated embodiment, input/output unit 160 couples power supply 110 to electronic device 100. User interface 170 is a user input device and/or component (e.g., a graphical user interface (GUI), a display device, a keyboard, a mouse, etc.) which enables a user to select and/or identify the desired user configuration setting 134 for operating electronic device 100. In some embodiments, video bus 180 is a communications component which enables video data, video information, and power to transfer between processor 120 and user interface 170. In the illustrated embodiment, video bus 180 is coupled to clock 182 configured to manage and/or control the rate of and/or speed with which video bus 180 transfers data and/or information.

In operation, firmware 132 executes clock frequency module 124 when electronic device 100 initializes and/or when a different user configuration setting is selected. Clock frequency module 124 is executed to ensure and/or adjust the component clocks (e.g., clock 126, 152, 182, etc) within electronic device 100 such that electronic device 100 is operating according to a desired user configuration setting. In this embodiment, clock frequency module 124 identifies the desired user configuration setting from user configuration settings database 134. Clock frequency module 124 then identifies the corresponding component clock settings from clock frequency database 136. Clock frequency module 124 then identifies the current clock frequencies for the corresponding components listed in clock frequency database 136 and determines whether the current clock frequencies matches the corresponding clock frequencies listed in clock frequency database 136. If the clock frequencies do not match, then clock frequency module 124 transmits a request to the corresponding component comprising the non-compliant clock frequency to adjust the clock frequency to the appropriate clock frequency. Clock frequency module 124 then performs a verification and/or check to ensure that none of the adjusted clock frequencies conflict with the performance of another component which may adversely affect the performance of electronic device 100 (e.g., electronic device 100 is not performing in accordance to the desired user configuration setting). For example, if the desired user configuration setting is to optimize wireless communications, clock frequency module 124 ensures that none of the current clock frequencies are adjusted and/or are shifted to operate in the same frequency and/or harmonic as clock 142 of wireless module 140, thereby causing noise and/or interfering with the efficiency of wireless communications.

Embodiments of clock shifting and prioritization system 102 enable clock frequency module 124 to automatically shift clock frequencies and/or perform a conflict check to ensure that electronic device 100 is operating in accordance with the desired user configuration setting. In some embodiments, the frequency of the conflict check can be established by a user and/or administrator of electronic device 100 and/or be a default setting set by the manufacturer of electronic device 100. In this embodiment, system 102 can automatically execute clock frequency module 124 in response to the period conflict check. Alternatively, processor 120 can execute clock frequency module 124 in response to a change in configuration of electronic device 100 which may potentially affect the ability of electronic device 100 to perform in accordance with the desired user configuration setting. Examples of such configuration changes include, but are not limited, installation and/or removal of components within electronic device 100, change in frequency adjustment configurations listed in clock frequency database 136, update in driver components, etc.

Embodiments of clock shifting and prioritization system 102 also enable clock frequency controller 124 to calculate the clock frequency and/or frequency to which to adjust and/or shift the corresponding component clocks (clock 126, 152, 182, etc). For example, clock frequency database 136 may comprise a frequency step adjustment (e.g., adjusting a clock frequency in 200 KHz steps anywhere between 65 MHz and 75 MHz). The frequency step adjustment identifies the allowable range and/or the increments to adjust (e.g., increase and/or decrease) each corresponding clock (e.g., clock 126, 152, 182, etc.). Alternatively, embodiments of clock shifting and prioritization system 102 may also enable clock frequencies to be calculated based on a harmonic instead of clock frequencies. Clock frequencies may conflict the performance of a component in electronic device even if the component is operating at a different frequency but in the same harmonic. A harmonic is an integer multiple of a frequency. Therefore, in this embodiment, clock frequency controller 124 would perform two calculations instead of one calculation: (1) calculating a representative frequency corresponding to the harmonic; and (2) calculating the frequency adjustment for the corresponding clock. Alternatively, embodiments of clock shifting and prioritization system 102 may also the bandwidth of a clock frequency to be calculated based on the calculated harmonics. The bandwidth of the clock frequency is the range of frequencies with which another component may conflict. The identification of conflicting bandwidths is based on whether the clock frequencies are operating in the same frequency. Thus, in this embodiment, clock frequency controller 124 would identify the corresponding harmonics for the different clock frequencies of the components. Clock frequency controller 124 would then use that information to identify the bandwidths which may potentially cause a frequency conflict. In this embodiment, clock frequency controller 124 may also identify the clock frequencies and/or harmonics for each component to stay away from so that a frequency conflict will not arise.

Embodiments of clock shifting and prioritization system 102 enable clock frequency module 124 to identify which clocks to shift based on a user-specified prioritization scheme in the event that a frequency conflict arises. In this embodiment, if clock frequency module 124 identifies a frequency conflict, then clock frequency module 124 identifies the channel to which wireless module 140 is connected by reading the frequency value specified by connected channel identifiers 142. Clock frequency module 124 then reads the user-specified prioritization scheme stored in prioritization database 138 to identify the appropriate clock frequency for the conflicting component. For example, consider a configuration in which the user has selected the maximum performance of processor 120 as a first priority and the maximization of wireless module 140 as a second priority. In this example, clock frequency module 124 identifies that video bus clock 182 cannot operate at a clock frequency which will enable electronic device 100 to perform in accordance with all desired user configuration settings 134. In this embodiment, clock frequency module 124 would then select a clock frequency for video bus clock 182 which meets the first priority and also does not conflict with the frequency with which wireless module 140 is operating if a wireless module 140 is operating.

FIG. 2 is an embodiment of clock frequency database 136 for clock shifting and prioritization system 102. In the illustrated embodiment, clock frequency database 136 is a table identifying the corresponding frequency configurations for a particular clock for a particular component in electronic device 100 (FIG. 1). In the illustrated embodiment, clock frequency database 136 lists a maximum frequency 220, a minimum frequency 230, and a frequency step adjustment 240 for each of processor clock 126, hard disk drive clock 152, and video bus clock 182 for each user configuration setting (e.g., maximize usage of power supply 110, maximize performance of processor 120, maximize wireless module 140, etc.). In the illustrated embodiment, maximum frequency 220 and minimum frequency 230 establishes an acceptable range of frequencies for which each corresponding clock (e.g., clocks 122, 152, and 182) can operate with respect to a particular user configuration setting. In the illustrated embodiment, frequency step adjustment 240 identifies the increments in which clock frequency module 124 (FIG. 1) can adjust each corresponding clock in response to a frequency conflicting with the ability of electronic device being to operate in accordance with a specified user configuration. For example, clock frequency module 124 can adjust the clock frequency of video bus clock 182 in 0.2 MHz increments between the frequency range of 65 MHz and 75 MHz in order for electronic device 100 to operate in accordance with the specified user configuration setting of maximizing performance of processor 120. It should be understood that clock frequency database 136 may comprise greater, fewer, and/or different components, frequencies, etc. and be presented in a variety of formats (e.g., charts, etc.).

FIG. 3 illustrates an embodiment of prioritization database 138 used by clock shifting and prioritization system. In the illustrated embodiment, prioritization database 138 is a table identifying possible prioritization configurations and/or schemes for various user configuration settings. In the illustrated embodiment, the user can designate the two user configuration settings as the top priority and the order of the user configuration settings. It should be understood, however, that more or fewer priorities and/or configurations may exist. In operation, clock frequency module 124 will identify the configuration (e.g., configuration 1, configuration 2, configuration 3, configuration 4, etc.) which the user has designated and/or specified as the prioritization scheme for electronic device 100. Based on the information in clock frequency database 136, clock frequency module 124 identifies the clock frequencies for all clocks identified in the specified user configuration setting. If none of the clock frequencies create a frequency conflict, then clock frequency module 124 adjust all the clocks in accordance with the specified user configuration setting. If, however, one or more of the clock frequencies conflict, then clock frequency module 124 refers to prioritization database 134 to identify the user configuration setting with the highest priority. Clock frequency module 124 then adjusts the corresponding clock frequency of the clock to the designated clock frequency for the user configuration setting with the highest priority.

Figure 4:
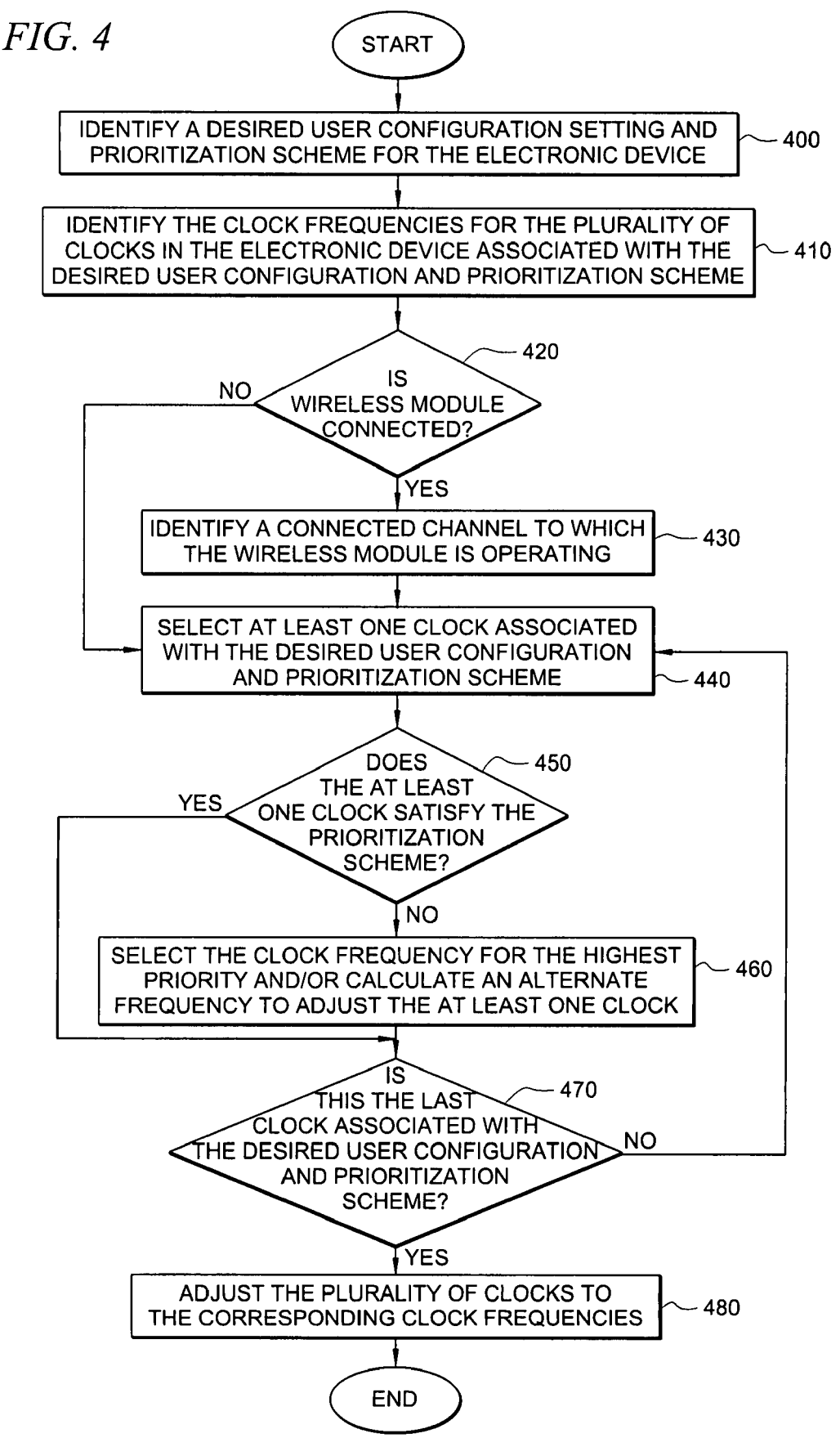
FIG. 4 is a flowchart illustrating an embodiment of a dynamic clock shifting and prioritization method.

FIG. 4 is a flowchart illustrating an embodiment of a dynamic clock shifting and prioritization method. The method begins with block 400 where clock frequency module 124 identifies a desired user configuration setting and prioritization scheme for electronic device 100. Clock frequency module 124 then identifies a corresponding clock frequency for a plurality of clocks (e.g., clock 122, 152, 182, etc.) in electronic device 100 associated with the desired user configuration setting and prioritization scheme (block 410). Clock frequency module 124 then determines whether a wireless module is connected (decision block 420). If a wireless module is connected ("yes" output to decision block 420), then clock frequency module 124 identifies the connected channel (e.g., connected channel identifier 142) to which wireless module 140 is connected (block 430), with the method proceeding to block 440 thereafter. If a wireless module is not connected ("no" output to decision block 430), the method proceeds to block 440 thereafter. Clock frequency module 124 then selects at least on clock associated with the desired user configuration and prioritization scheme (block 440). Clock frequency module 124 then determines whether the at least one clock satisfies the prioritization scheme (decision block 450). If the at least one clock does not satisfy the prioritization scheme ("no" output to decision block 450), then clock frequency module 124 selects the clock frequency for the highest priority user configuration setting and/or optionally calculates an alternative frequency to adjust the at least one clock (block 460). Clock frequency module 124 then determines whether this clock is the last clock associated with the desired user configuration and prioritization scheme (decision block 470). If this is the last clock ("yes" output to decision block 470), then clock frequency module adjusts the plurality of clocks to the corresponding clock frequencies (block 480), with the process terminating thereafter. Returning to decision block 470, if this is not the last clock ("no" output to decision block 470), then the method returns to block 440 thereafter. Returning to decision block 450), if the clock does satisfy the prioritization scheme ("yes" output to decision block 450), then the method proceeds to decision block 470 thereafter.

The illustrative embodiments may be implemented in software and can be adapted to run on different platforms and operating systems. In particular, functions implemented by clock shifting and prioritization system 102, for example, may be provided by an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electro-magnetic, infrared, or semi-conductor system, apparatus, device, or propagation medium.

Embodiments of clock shifting and prioritization system 102 enables electronic device 100 to operate at a specified performance level based on a specified user configuration priority 134. Clock shifting and prioritization system 102 enables a user to identify and choose a desired using configuration setting at which to operate electronic device 100. Clock shifting and prioritization system 102 can automatically adjust and continually monitor the different clock frequencies to ensure that each component is operating within the desired user configuration setting.

What is claimed is:

1. A clock shifting and prioritization method, comprising:
adjusting a frequency for a plurality of clocks corresponding to a plurality of respective components of an electronic device based on a desired user configuration setting for operating the electronic device.

2. The method of claim 1, further comprising adjusting at least one clock in the plurality of clocks to resolve a conflict with a frequency of another component of the electronic device.

3. The method of claim 1, further comprising identifying corresponding clock frequencies for the plurality of clocks associated with the desired user configuration setting.

4. The method of claim 1, further comprising determining whether a current clock frequency for each of the plurality of clocks matches a corresponding clock frequency listed in a clock frequency database for the desired user configuration setting.

5. The method of claim 1, further comprising calculating a frequency to which to adjust the plurality of clocks based on corresponding clock frequencies listed in a clock frequency database.

6. The method of claim 1, further comprising verifying that a frequency to which the plurality of clocks is adjusted does not adversely affect a performance of the electronic device from based on the desired user configuration setting.

7. The method of claim 1, further comprising verifying that a frequency to which the plurality of clocks is adjusted does not conflict with a frequency of another component of the electronic device.

8. The method of claim 1, further comprising automatically executing a clock frequency module to adjust the frequency of the plurality of clocks.

9. The method of claim 1, further comprising adjusting the frequency for at least one clock in the plurality of clocks to a frequency corresponding to a highest priority in a user-specified performance scheme in response to a frequency conflict.

10. An electronic device, comprising:
a clock frequency module configured to adjust a frequency for a plurality of clocks corresponding to a plurality of respective components of the electronic device based on a desired user configuration setting for operating the electronic device.

11. The electronic device of claim 10, further comprising the clock frequency module configured to adjust at least one clock in the plurality of clocks to resolve a conflict with a frequency of another component of the electronic device.

12. The electronic device of claim 10, further comprising the clock frequency module configured to identify corresponding clock frequencies for the plurality of clocks associated with the desired user configuration setting.

13. The electronic device of claim 10, further comprising the clock frequency module configured to determine whether a current clock frequency for each of the plurality of clocks matches a corresponding clock frequency listed in a clock frequency database for the desired user configuration setting.

14. The electronic device of claim 10, further comprising the clock frequency module configured to calculate a frequency to which to adjust the plurality of clocks based on corresponding clock frequencies listed in a clock frequency database.

15. The electronic device of claim 10, further comprising the clock frequency module configured to verify that a frequency to which the plurality of clocks is adjusted does not adversely affect a performance of the electronic device from based on the desired user configuration setting.

16. The electronic device of claim 10, further comprising the clock frequency module configured to verify that a frequency to which the plurality of clocks is adjusted does not conflict with a frequency of another component of the electronic device.

17. The electronic device of claim 10, further comprising the clock frequency module configured to automatically execute a clock frequency module to adjust the frequency of the plurality of clocks.

18. The electronic device of claim 10, further comprising the clock frequency module configured to adjust the frequency for at least one clock in the plurality of clocks to a frequency corresponding to a highest priority in a user-specified performance scheme in response to a frequency conflict.

19. A computer-readable medium having stored thereon an instruction set to be executed, the instruction set, when executed by a processor, causes the processor to:
adjust a frequency for a plurality of clocks corresponding to a plurality of respective components of the electronic device based on a desired user configuration setting for operating the electronic device.

20. The computer-readable medium of claim 19, wherein the instruction set, when executed by the processor, causes the processor to adjust at least one clock in the plurality of clocks to resolve a conflict with a frequency of another component of the electronic device.

21. The computer-readable medium of claim 19, wherein the instruction set, when executed by the processor, causes the processor to identify corresponding clock frequencies for the plurality of clocks associated with the desired user configuration setting.

22. The computer-readable medium of claim 19, wherein the instruction set, when executed by the processor, causes the processor to determine whether a current clock frequency for each of the plurality of clocks matches a corresponding clock frequency listed in a clock frequency database for the desired user configuration setting.

23. The computer-readable medium of claim 19, wherein the instruction set, when executed by the processor, causes the processor to calculate a frequency to which to adjust the plurality of clocks based on corresponding clock frequencies listed in a clock frequency database.

24. The computer-readable medium of claim 19, wherein the instruction set, when executed by the processor, causes the processor to verify that a frequency to which the plurality of clocks is adjusted does not adversely affect a performance of the electronic device from based on the desired user configuration setting.

25. The computer-readable medium of claim 19, wherein the instruction set, when executed by the processor, causes the processor to verify that a frequency to which the plurality of clocks is adjusted does not conflict with a frequency of another component of the electronic device.

26. The computer-readable medium of claim 19, wherein the instruction set, when executed by the processor, causes the processor to automatically execute a clock frequency module to adjust the frequency of the plurality of clocks.

27. The computer-readable medium of claim 19, wherein the instruction set, when executed by the processor, causes the processor to adjust the frequency for at least one clock in the plurality of clocks to a frequency corresponding to a highest priority in a user-specified performance scheme in response to a frequency conflict.

* * * * *